Oct. 25, 1955      J. C. GILPIN      2,721,697

ELECTROMAGNETIC DRIVE MEANS FOR COMPUTING MACHINES

Filed Jan. 9, 1952

SUPPLY

INVENTOR,

John C. Gilpin

United States Patent Office 2,721,697
Patented Oct. 25, 1955

2,721,697

ELECTROMAGNETIC DRIVE MEANS FOR COMPUTING MACHINES

John C. Gilpin, Toronto, Ontario, Canada

Application January 9, 1952, Serial No. 265,635

1 Claim. (Cl. 235—62)

The invention relates to improvements in computing machines and the like as described in the present specification and shown in the accompanying drawings that form a part of the same.

Heretofore computing machines have been either of the hand operated type or of the motor equipped electrically operated type. The hand operated type of machine has been proven to be slow and laborious and, while the advent of the electric machine has resulted in increased speed of operation the cost of such a machine, requiring as it does a motor and many additional parts, has made its purchase impractical in a great many instances.

The main object of the present invention is to provide a computing machine combining the simplicity of the conventional hand operated machine with the advantages of the electric motor driven machine without materially increasing the cost and without the use of an electric motor.

The primary object of the present invention is attained through the provision of an arm movable lengthwise by means of an electro-magnet and having connection of a pivotal nature at one end with the outer end of the handle attached to the operating shaft of the conventional hand operated machine whereby the lengthwise movement of the arm will cause the shaft to be rotated a predetermined distance, the electrical circuit through the electro-magnet, or solenoid, being normally open and adapted to be closed through the medium of a push button or other device adaptable to the purpose.

Another important object of my invention is the incorporation of the various elements constituting my invention in a compact unit within a casing which may be easily and quickly attached to a hand operated machine of conventional type and wherein but a simple connection between one of the elements of the machine and one of the elements of my invention is required to put the hand operated machine under electrical control.

With the above and other objects in view the invention consists in the novel features of construction, arrangements and combinations of parts described in the present specification and more particularly pointed out in the claim for novelty following.

In describing the invention reference will be made to the accompanying drawings, in which.

Like numerals of reference indicate corresponding parts in the various figures.

Figure 1:
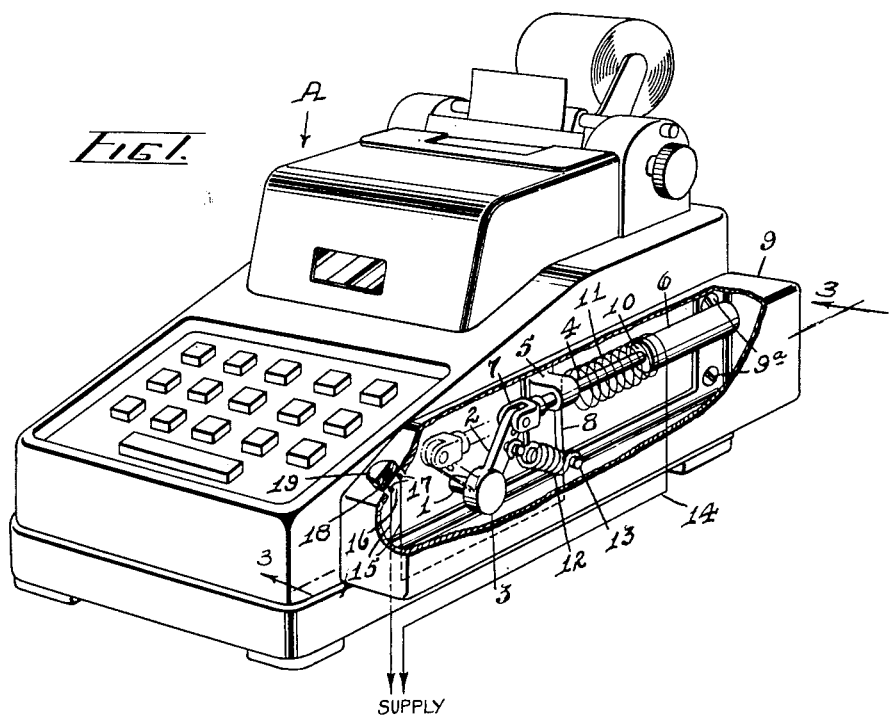
Figure 1 is a perspective view of a computing machine embodying my invention, a portion of the casing enclosing the various parts of my said invention being broken away, and the alternate position of the control arm being shown in dotted lines.

Referring to the drawings, in which for the purpose of illustrating the principles of my invention one complete exemplification thereof is shown, A indicates generally a machine representative of the conventional hand operated type, in which the results of the computations arrived at through the manipulation of appropriate keys cooperating with the computing mechanism are recorded on a tape through the medium of type bars adapted to be operated by a shaft 1 which projects from the casing of the machine and is usually provided with a suitable handle whereby its limited rotary movement may be effected by hand. This rotary movement of the shaft is limited to the distance necessary to allow the required throw of the type bars and such rotation is against such spring resistance as will result in the shaft being returned to its original position after each manual operation.

As the present invention contemplates only a simple, convenient and inexpensive arrangement for effecting such partial rotation of the shaft as is necessary to insure proper operation of the type bars and is not in any way concerned with the computing mechanism no detailed description or showing of such mechanism is thought necessary, it being considered sufficient to merely show the protruding end of said shaft, to which the invention is applied.

The shaft 1 is provided with a handle or lever 2 carried by a hub 3 which may be fixed to the shaft in any desired manner so that the handle will extend at right angles to the shaft in an upward direction at a slight rearward angle.

4 is an arm journaled rearwardly of the handle 2 for reciprocation on a horizontal plane in spaced front and rear bearings 5 and 6 respectively, the said arm having a forked forward end portion 7 pivotally connected to the end of the handle 2 whereby lengthwise reciprocation of said arm will result in a rocking movement of the handle and a consequent reciprocatory movement of the shaft 1.

The front bearing 5 for the arm 4 consists of a suitably apertured bracket which is preferably a laterally projecting part of the inner frame part 8 of the casing 9, which latter is removably attached to the side wall of the machine, preferably by bolts 9a, and encloses the projecting end of the shaft 1 and provides the mounting for the various working parts of my invention.

The rear support 6 for the arm 4 consists of a horizontally disposed hollow cylinder suitably supported within the casing 9 and having its bore of the required size to slidably receive the plunger part 10 fixed to the rear end of the said arm.

The arm 4 is adapted to be moved forwardly through the influence of an electro-magnet 11 encircling the said arm in advance of the cylinder 6 and acting on the piston-like part 10 of the said arm, which part in effect constitutes the core of the magnet and is located substantially rearwardly of the electro-magnet so that the latter upon being energised will draw the said core inwardly.

A coil spring 12 secured at its one end to the handle 2 and at its other end being attached to a pin 13 carried by the frame part 8 provides the means for holding the handle 2, and consequently the arm 4, to their normal rearward positions.

The circuit through the electro-magnet and the source of electric energy consists of suitable wires extending from the respective ends of the coil, one of such wires, indicated at 14, being uninterrupted between the coil and the source of energy and the other wire, shown at 15, being broken to provide a gap, as at 16, whereby the circuit through the electro-magnet is normally open, during which condition the arm 4, due to the fact that the shaft 1 is spring influenced to its rearwardly rotative limit, will rest with the part 10 rearwardly of the magnetic coil. The opposing ends of the wire 15 at the gap have connection with suitable terminals, indicated at 17.

The circuit through the terminals is adapted to be closed by means of a suitch which may be of any suitable type and which is indicated herein generally by the numeral 18 and which preferably includes a push button 19, or other suitable device, accessible exteriorly of the casing 9 and preferably located at the front of the machine. As there are many well known types of switches suitable to the purpose the construction of the switch is not shown in detail.

As the circuit through the electro-magnet is normally open the shaft 1 which is spring-held to its inoperative position will cause the arm 4 to normally rest in its rearmost position with the part 10 behind the coil. When it is desired that the result of a computation be recorded on the tape through the agency of the shaft 1 it is simply necessary to press the button 19 downwardly, which has the effect of closing the circuit through the magnetic coil whereupon the arm part 10 will be drawn forwardly causing the arm to move the handle 2 and thus impart rotary movement to the shaft 1, which through its selective connection with the type bars (not shown) effects the desired result. Upon release of the pressure on the button the circuit through the electro-magnet will be broken, thus permitting the shaft to return to its normal position under the influence of the spring 12, which has the effect of returning the part 10 to a position rearwardly of the electro-magnet.

Figure 2:
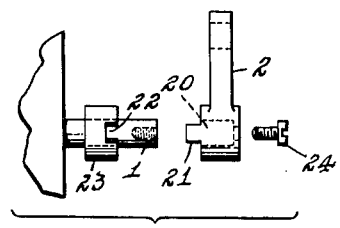
Figure 2 is an exploded front elevational view showing the projecting end of the machine shaft and a modified form of crank handle and connection therefor.
Figure 3:
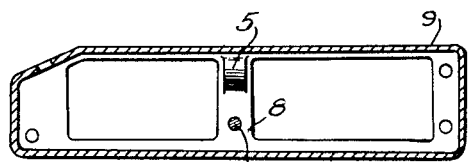
Figure 3 is a central longitudinal section through the casing alone, taken on the line 3—3 of Figure 1.

In Figure 2 a convenient handle structure and means for securing same to the shaft 1 is shown in detail, wherein the hub 3 is provided with a recess 20 in its inner face to receive the said shaft and further has an inwardly extending lug 21 adapted to fit a correspondingly shaped slot 22 in a collar 23 fixed on the shaft at a point somewhat removed from its end. An externally threaded bolt 24 extending through the outer end wall of the hub and threading into a threaded opening in the outer end of the shaft provides means for locking the handle to the collar.

The incorporation of my simple and inexpensive device with the conventional hand operated machine will be found to give the advantages of speed and accuracy provided by wholly electric machines only available at much greater cost, while the compact arrangement of parts assembled within the casing permits of the invention being easily and quickly attached to the machine.

While I have herein shown and described a preferred arrangement and one modification thereof, it will be readily understood that changes and modifications may be found desirable or essential in meeting the various exigencies of use, and I desire to be understood as reserving the right to make any and all such changes or modifications as may be found desirable or essential in so far as the same may fall within the spirit and scope of the invention as expressed in the accompanying claim when broadly construed.

What I claim is:

An attachment for a computing machine including a rotatable shaft, said shaft having one of its ends projecting from the machine, comprising a casing removably attached to said machine and enclosing the projecting end of said shaft, said casing having an interior frame part constituting a bearing member, said bearing member having an aperture therethrough, a lever fixed to the projecting end of said shaft and extending laterally therefrom within the casing, elastic means secured at one end to said lever and at its other end being connected to said interior frame part and exerting yielding influence on said lever to hold said shaft normally to a pre-actuating position, an electro-magnet mounted within said casing, an electric circuit for energizing said electromagnet, said circuit being normally open, an arm reciprocable in a plane substantially at right angles to the longitudinal axis of said shaft, said arm having pivotal connection at one end with said lever, said arm being slidably guided in said aperture in said bearing member, the said arm being movable through the enerization of said electro-magnet in a direction to cause rotary movement of said shaft against the pull of said elastic means, and manually operable switch means mounted on and accessible exteriorly of said casing for closing the electric circuit through said electro-magnet to cause said arm to move said lever against the influence of said elastic means.

References Cited in the file of this patent

UNITED STATES PATENTS

| | | |
|---|---|---|
| 959,548 | Kettering | May 31, 1910 |
| 1,005,774 | Hoyt | Oct. 10, 1911 |
| 1,262,702 | Rinsche | Apr. 16, 1918 |